Oct. 13, 1942.     H. H. BRUDERLIN     2,298,611
TENSION COMPENSATING DEVICE
Filed May 18, 1940     4 Sheets-Sheet 1

HENRY H. BRUDERLIN
INVENTOR.

BY *James M. Clark*

ATTORNEY.

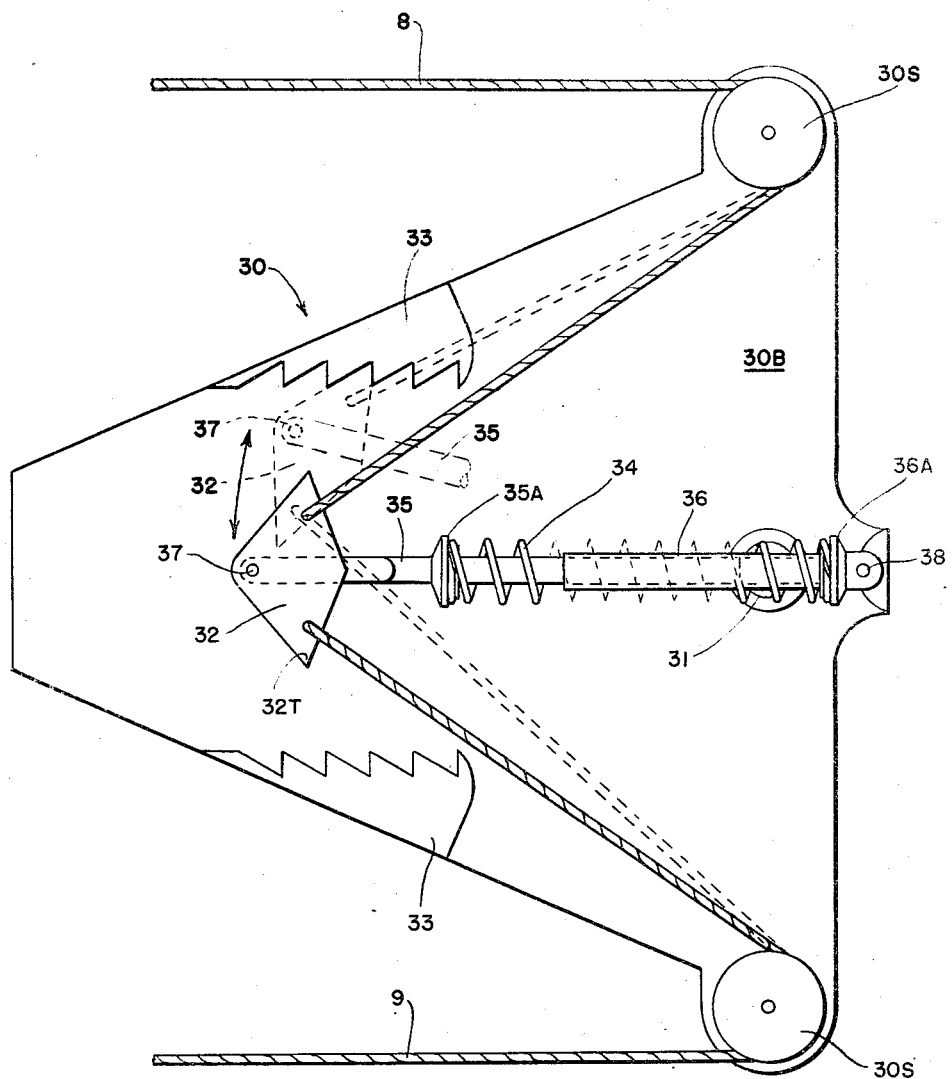

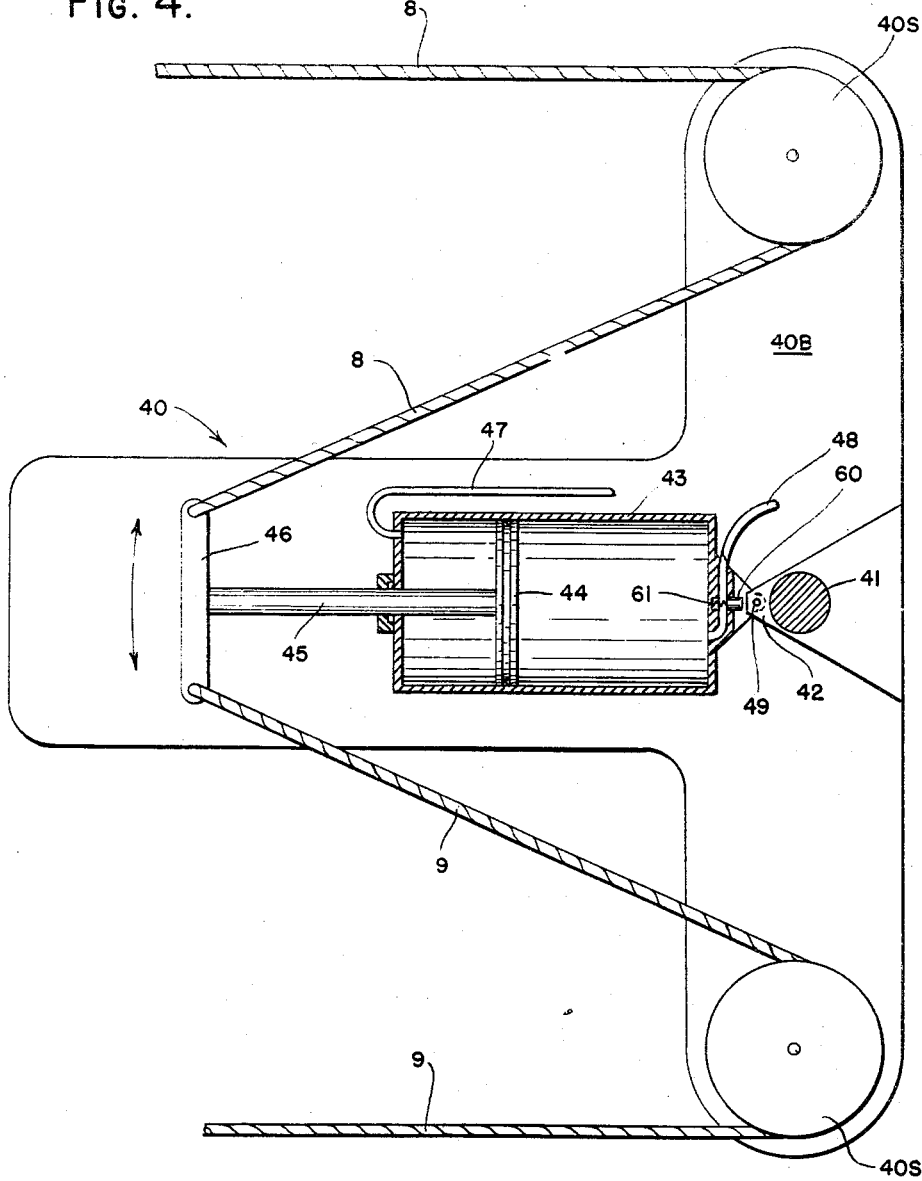

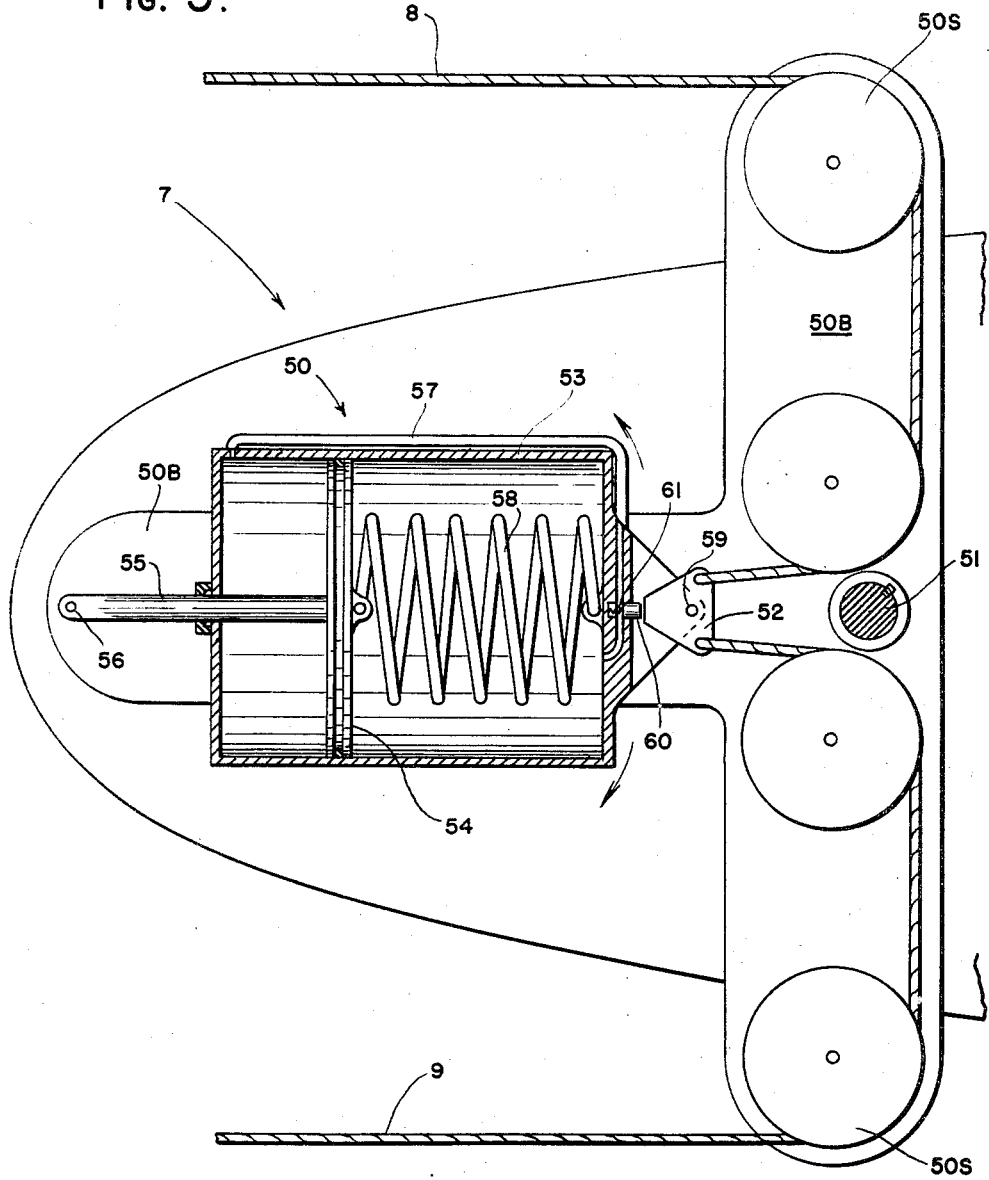

Patented Oct. 13, 1942

2,298,611

UNITED STATES PATENT OFFICE 2,298,611

TENSION COMPENSATING DEVICE

Henry H. Bruderlin, Hermosa Beach, Calif., assignor to Douglas Aircraft Company, Inc., a corporation of Delaware Application May 18, 1940, Serial No. 335,875

20 Claims. (Cl. 244—75)

This invention relates to equalizing devices and more particularly to cable tension compensators for steering control systems for aircraft and ships.

In the cable operation of aircraft control and other movable parts, it is the general practice to transmit motion to such parts by tensile pull on one or the other of two runs of flexible cable. The control cables are usually guided by suitable pulleys or sheaves pivotally supported upon the aircraft structure, and the control systems frequently extend considerable distances from the operator's position to remote portions of the aircraft. These present systems are necessarily designed such that the initial rigging tension in the cables, as measured by a tensiometer or like device, is relatively high, and is maintained at all times as nearly constant as possible throughout all of the various positions of the movable surface or part. Due to a number of varying conditions prevailing in aircraft structures and the forces to which they are subjected, it has not heretofore been readily possible to provide satisfactory means to compensate for tendencies toward changes in the tension of the control cables.

Airplanes are frequently subjected to sudden and extreme changes in temperature, as for example, when a fast climbing pursuit or interceptor type aircraft, which has been parked in the hot sun on a landing field, is suddenly required to take off and climb to relatively high altitudes, where relatively low temperatures prevail. Inasmuch as the operating cables are usually of a different material than the aircraft structure upon which the terminals of the cable system are guided or supported, the different coefficients of expansion under such varying temperature changes cause considerable variation in the cable tension.

The tension of control cables also varies during the operation of the aircraft due to wear and stretch of the cable which is aggravated by extreme rigging loads to prevent slackening at lower temperatures; and the tension is also occasionally varied due to vibration and deflection of the parts to which the cables are connected or guided, and by that of the intermediate supporting structure.

The cable control systems now in general use, which are devoid of satisfactory means for cable tension compensation, require a much higher rigging tension with the inherent disadvantages of greater friction and wear, and increase in the manual or control forces necessary to move the controls. Non-compensated cable systems also cause lack of uniformity in the feel of the controls, inability to properly compute the flutter characteristics of the surfaces and also add materially to pilot fatigue.

The present invention, which overcomes the above and other disadvantages of prior cable control devices, consists briefly in its preferred form, in a compensating unit which may be mounted directly on the pivot axis of the movable part and which normally interposes a predetermined equalizing force of a resilient character which may be furnished by a mechanical spring, hydraulic or other device, at a deflected middle portion of the cable. When subjected to operating pull the resilient force is automatically made ineffective and the control becomes locked to the movable part for its desired rotation.

It is a major object of the present invention to provide a relatively simple and satisfactory device which at all times maintains the tension in the cables at a constant predetermined magnitude. It is also an object to provide a relatively small and compact compensating unit which can be mounted upon and carried by the pivot or shaft of the movable part, and to be capable of being substantially fully housed within the profile of the control surface or the body to which it is pivoted.

It is a further object to provide a compensating device which will maintain a constant predetermined rigging tension throughout the control system during all conditions of temperature and dimensional variations which normally tend to vary the cable tension. It is also an object to provide such a compensating device which functions only while the tension in the cables is equalized or is of the same order of magnitude, and which is automatically overcome, or locked out, on operation of the control system.

It is a further object of the present invention to provide a tension compensating device which will permit of reduced rigging loads which can be greatly exceeded by the applied loads or control forces. A further object resides in the reduction of friction and wear of the parts of the cable system and the maintenance of constant tension forces which make it possible to more accurately compute flutter conditions at higher speeds.

Other objects and advantages of this invention will become apparent to one skilled in the art after a reading of the present description and all are intended to come within the scope of this invention as defined in the appended claims.

In the drawings which form a part hereof:

Fig. 3 shows another modification of the spring tensioned compensating device;

Fig. 4 shows an enlarged detail of a modified compensator utilizing hydraulic deflecting means; and Fig. 5 discloses a preferred modification of a combined hydraulic and spring operated compensator.

Figure 1:
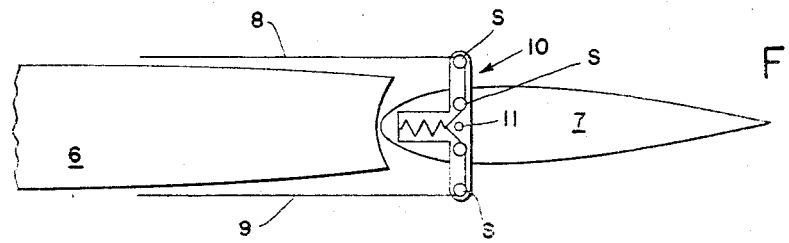
Fig. 1 is a diagrammatic view of the compensating device applied to a control surface.

Referring now to Fig. 1, a fixed fin or airfoil is indicated at 6 and has movably associated therewith a control surface or rudder 7 movable by tensile pull on either of the cables 8 or 9 and rotatable about the axis of the pivot 11. Although the word "cable" will be generally used throughout this description and the appended claims, it is intended to include wire, wire rope, rope, chain and other similar flexible operating equivalents. A tension compensating device is diagrammatically shown at 10, being movable with the control surface 7 and being rotatable therewith about the axis of the pivot 11. It may either be keyed or otherwise fixed to the rotatable shaft 11, or it may be fixed directly to the control surface structure. The compensating device 10 comprises a double bellcrank or T-shaped frame having its transverse portion disposed in the usual position of the operating horns of the control surface and having its biasing or tensioning means disposed in the stem portion of the T extending chordwise of the surface and normally in general alignment and either slightly forward or rearward of the pivot 11. Suitable sheaves S are provided at the lateral extremities of the horn or lever portions which extend into the airstream sufficiently to provide leverage for moving the surfaces. These outer sheaves S, together with an inner pair, serve to guide the cable runs 8 and 9 to the compensating portion and are preferably housed in suitably streamlined horns to offer a minimum resistance to the airstream.

Figure 2:
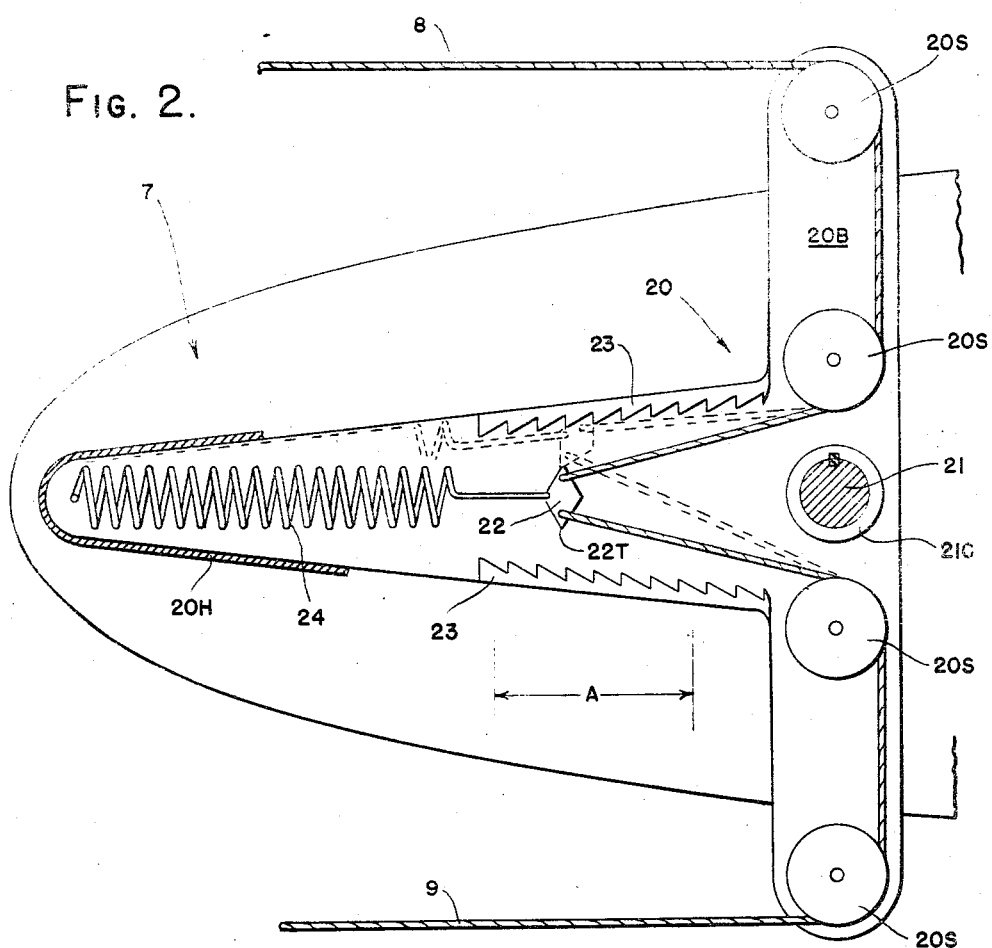
Fig. 2 shows an enlarged detail of the spring tensioned compensating device.

In Fig. 2 the compensating device, designated by the numeral 20, comprising a T- or bellcrank portion 20B having a hub or collar 21C which is fixed to the pivot 21 substantially at the intersection of its stem and transverse, or horn, portions, it being understood that the frame of the bellcrank 20B may either be suitably fixed to the structure of the control surface, or directly to the shaft 21, such that it is movable with the surface about the axis of the pivot 21. The cable run 8 is guided by the outer and inner sheaves 20S and terminates in a pivotal connection to the diamond-, or lozenge-shaped dog or pawl 22. The latter also forms the terminal for the other cable run 9 which is similarly guided by the sheaves or pulleys 20S symmetrically disposed about the axis of symmetry of the device. The pawl 22 is preferably shaped such that its major axis extends laterally and is provided with acute pointed portions which are adapted to engage and fit within the rows of teeth 23 provided laterally along the sides of the stem portion of the bellcrank. A tension spring 24 designed to exert a predetermined tensile pull is pivotally anchored at its forward end to the terminal portion of the stem preferably equidistant from the sheaves 20S, and is also pivotally anchored to the pawl 22. The spring 24, which has a straight or uncoiled portion adjacent to the pawl and the toothed rack 23, is of a shorter over-all length than that of the stem portion such that the pawl 22 is resiliently or floatingly maintained at a distance spaced forward of the pivot axis 21, and resulting in a deflected portion of the adjacent ends of the cable runs 8 and 9. The stem portion of the bellcrank frame is preferably provided with a housing indicated fragmentarily at 20H to protect the spring cable terminals and other moving portions from fouling other parts.

The compensating device shown in Fig. 2 operates as follows: Let us assume that the control system of which the cable runs 8 and 9 and the compensating device 20 form a part, is initially rigged for a 100 pound tensile pull in each cable. This requires that the tension spring 24 be designed to exert a 200 pound pull to maintain the pawl 22 and the cable terminals in a resiliently equalized normal or aligned position substantially as shown in the full lines in Fig. 2. In this balanced or equalized state of the control system it should be noted that any expansion or contraction in cable 8 will normally be duplicated by a like expansion or contraction in cable 9 inasmuch as these cables are of the same material and identical characteristics and are of exactly the same length. Accordingly, should the temperature of cables 8 and 9 be increased their lengths will also increase by like amounts and be compensated for by the tensile pull continually exerted by the spring 24, also compensating for normal tension differentials.

Assuming now that the trailing edge of the rudder is to be swung upwardly, as viewed in Fig. 1, a forward pull in the usual manner is exerted upon the upper cable run 8. Inasmuch as the tensile forces within the cable runs 8 and 9 are now no longer equal and opposite to each other the spring 24, which can exert its tensile force only in a rectilinear or axial direction and not laterally, it rotates about its fixed pivot and permits the lateral movement of the pawl 22 to a position adjacent the toothed rack 23 as indicated by the dotted lines in Fig. 2. The greater actuating pull of the cable 8 upon the pawl 22 which is pivoted about the adjacent terminal of the spring causes rotation of the pawl and engagement of its nearest pointed portion 22T with one of the teeth in the rack 23. This serves to lock the cable 8 with respect to bellcrank lever 20B with the result that the action of the spring 24 is "locked out" or nullified, and the control forces exerted on the cable 8 are transmitted directly to the horns of the lever 20B and the control surface 7 becomes rotated in the proper direction and to the desired extent.

When it becomes necessary to return the control surface to the neutral position the pull in the cable 8 is reduced to a magnitude substantially that of its rigging tension and due to its extended position, a temporarily greater pull is exerted in the cable run 9. These unequal cable forces exerted upon the lateral terminals of the pawl 22, and the tensioning force of the spring 24, causes rotation of the pawl in the opposite direction about its spring pivot portion which results in unlocking of the pawl from the rack 23 and movement into its aligned or centralized position. It is also obvious that an operating force, or a continuation of pull of a greater magnitude in cable 9 will result in continued counter-clockwise rotation of the pawl and lateral movement into a position where it engages with, and becomes locked to the toothed rack 23 adjacent to the cable run 9 and the control surface is rotated in the corresponding direction. The dimension A outlined by the construction lines in Fig. 2 indicates the relative movement of the locking pawl 22 due to the varying magnitude of control forces, the tension differential in the respective cables and other conditions which are normally met with during the operation of the control surface and the compensating device. It is for this reason that a plurality of teeth are provided in each of the ratchet racks or detents 23.

Referring now to Fig. 3 the compensating device 30 is basically the same as diagrammatically shown in Fig. 1, the only essential difference being that a compression spring 34 is substituted for the tension spring in the previous modification, a rod and tube guide provided to position the compression spring and only single sheaves 30S are required at the extremities of the lever or horn portion. The bellcrank 30B has pivotally mounted thereon the sheaves 30S over which cable runs 8 and 9 are guided and terminate in the locking pawl 32. The latter is pivoted at 37 to a flattened terminal of a rod 35 carrying an abutment 35A and having its other terminal fitted to telescope within a tubular member 36 having a similar abutment 36A, and with an adjacent apertured terminal pivotally mounted upon the body of the member 30 at pivot 38. The compression spring 34 is interposed between the abutments 35A on the rod 35, and 36A of the tube 36 in concentric relationship with the telescoping elements 35 and 36 and is designed to exert a predetermined outward force to establish the initial rigging tension in the cables 8 and 9. Although cables 8 and 9 have been referred to as terminals of separate cable runs, they obviously may be portions of the same cable threaded through and pivotally fixed to the link 32.

The frame of the member 30B is provided with a suitable aperture hub, preferably centrally located intermediate the pivots of the sheaves 30S and adapted to engage the pivot 31 of the control surface for rotation therewith. The pawl 32 is suitably shaped with tongue portions 32T which are adapted to engage in locking relationship with any of a series of teeth in the rack 33. The modification of the device shown in Fig. 3 is essentially the same as the modification of Fig. 2 differing only in the position of the locking elements which are more remotely spaced from each other and the pivot 31; the use of but two sheaves and a guided compression spring to equalize and centrally position the link 32 with its associated terminals of cables 8 and 9 at a position spaced from the pivot 31. As in the case of the previous modification, rotation of the member 30B and the control surface to which it is fixed is similarly accomplished by pull on cable 8 resulting in upward movement of the locking pawl 32 and clockwise rotation about its pivot 37 in the rod 35 which in turn rotates in a clockwise direction about the pivot 38. The tongue 32T of the pawl engages and becomes locked with the upper toothed rack 33 after which further pull on the cable 8 causes rotation of the entire unit and the associated control surface.

The modification shown in Fig. 4 comprises an hydraulic tension compensating device 40 carried upon a similar T-shaped bellcrank 40B fixed to the control surface pivot 41. At the lateral extremities of the lever portions of the member 40B are pivotally mounted the sheaves 40S over which the cable runs 8 and 9 are guided. The cables terminate in an interconnecting element 46 spaced from the pivot 41 and having interposed therebetween the swingable hydraulic means which serves to maintain uniform tension in the cables and also to maintain a deflected cable portion between the two sheaves 40S. The bellcrank 40B is also provided with a portion 42 apertured for a pivot 49 about which the cylinder 43 is swingable for limited rotation. The cylinder 43 contains a piston 44 provided with suitable piston rings and carried by the piston rod 45 which is rigidly attached to the transverse member 46. The cylinder 43 is fluid-tight and the opening at the end through which the rod 45 is adapted to reciprocate is provided with a suitable packing gland. The latter end of the cylinder is provided with a conduit 47 connecting this end of the cylinder with a suitable fluid reservoir (not shown). The opposite end of the cylinder 43 is provided with a similar conduit 48 through which fluid at a predetermined constant pressure, determined by the desired initial rigging tension of the cables, is led into the adjacent portion of the cylinder. This end of the cylinder is provided with an hydraulic locking valve comprising a pin 60 closely positioned with respect to the cam face of the portion 42 and normally maintained in its open position by the compression spring 61. The predetermined fluid pressure exerted upon the piston is transmitted through the rod 45 to the member 46 and maintains the desired rigging tension in the cables.

The operation of the modification shown in Fig. 4 is as follows: Upon operating pull being exerted in cable 8, the piston rod 45, by virtue of its rigid connection to the cable interconnection member 46, causes the attached piston 44 to move inwardly against the fluid contained within the inner portion of the cylinder 43 and at the same time impart limited clockwise rotation to the cylinder and piston assembly due to the unequal pull upon the cables. As the hydraulic assembly is rotated about its pivot 49, being permitted to do so by the flexible conduits 47 and 48, at a predetermined position the pin 60 engages the contact surface of the portion 42 compressing the spring 61 and preventing further discharge of fluid from the adjacent cylinder portion back through the conduit 48. The closing of the valve 60, together with the incompressibility of the fluid in the adjacent cylinder portion, effects an hydraulic locking arrangement which arrests further relative movement of the piston within the cylinder and causes further tensile pull in the cable 8 to be transmitted to the bellcrank member 40B and hence to the control surface to which it is attached. On release of the control forces in cable 8 to its normal rigging tension, the temporarily greater tension in cable 9 imparts counterclockwise rotation to the hydraulic assembly about its pivot 49 and release of the pin 60, thereby opening the valve 61. The excess fluid pressure within the flexible conduit 48 is then permitted to enter the adjacent cylinder portion and to be exerted against the piston 44 thereby completely releasing the hydraulic lock and serving to centralize the hydraulic mechanism and the cable terminals in which position the tension forces in each cable are again equalized. Inasmuch as the cam faces of the portion 42 are symmetrical, control forces exerted upon the cable 9 actuate the device for opposite rotation in a similar fashion.

Fig. 5 shows a modification of the present invention in which a spring 58 provides the tensioning force, similar to the function of the spring in the embodiment shown in Fig. 2, and the by-pass conduit 57 provides an hydraulic lock generally similar to that in the modification of Fig. 4. The T-shaped bellcrank or base member 50B is provided with a plurality of sheaves 50S with their pivoted axes transversely aligned and with the axis 51 of the control surface centrally arranged with respect to the stem portion of the bellcrank 50B and in the region of the transverse center line of the sheave axes. The cables 8 and 9 which are run through the sheaves 50S are interconnected by a triangular-shaped link 52 having a cam face and pivoted upon an extended portion of the cylinder 53. The latter contains a piston 54 provided with suitable rings and is adapted to be reciprocated within the cylinder and to maintain two separate substantially fluid-tight compartments therewithin. The piston 54 has rigidly connected thereto a piston rod 55 which extends through a suitable fluid-tight packing gland in the cylinder head and is pivoted at its outer extremity to the pin 56 carried by the extremity of the stem portion of the bellcrank 50B and permitting the piston and cylinder assembly to be partly rotated with respect to the frame 50B about the pivot pin 56. A closed by-pass conduit 57 connects the inner and outer cylinder portions which are otherwise separated by the piston 54.

A spring 58 is anchored at one terminal to the movable piston and at its opposite terminal to the cylinder head adjacent the connecting link 52. The spring 58 is designed to provide the predetermined rigging tension in the cables 8 and 9 by exerting in tension the predetermined pulling force drawing the free end of the cylinder 53 toward the piston 54 and thereby causing an equalized tension to be exerted within the cables 8 and 9 and serving to centralize the piston-cylinder assembly with respect to the stem of the bellcrank 50B. At the cylinder head adjacent the interconnecting link 52 there is provided a fluid channel open to the conduit 57 and passing through a valve having its pin 60 normally maintained in its open position by the spring 61, and operating in a fashion similar to the valve in the modification shown in Fig. 4. In the open position of the valve the piston is free to move within the cylinder as the fluid passes from one side to the other through the conduit 57.

The operation of the device shown in Fig. 5 is as follows: Assuming that it is desired to rotate the bellcrank 50B and its associated control surface in a counterclockwise direction about its pivot 51 a control force is exerted pulling cable 8 to the left, or in a forward direction. The pull in cable 8 imparts clockwise rotation to the triangular link 52 about its pivot 59 and also causes a counterclockwise rotation of the piston-cylinder assembly 53—55 about its pivot 56 due to the tendency of the pivotally connected terminal of the cable 8 to become aligned with the axis of the pivots 56 and 59. As the link 52 rotates in an opposite direction to the cylinder 53 the contact face of the link 52 depresses the valve pin 60, compressing the spring 61 and closing the port. This prevents further flow of fluid from the outer portion of the cylinder through the conduit 57 into the portion occupied by the spring 58 thereby serving in effect as an hydraulic lock to maintain a fixed relationship between the piston 54 and the cylinder. Prior to the closing of the valve and its locking action, the extension of the piston rod 55 from the cylinder due to pull in the opposite direction by the cable 8 was resiliently opposed by the spring 58. Since the piston and cylinder are now in locked relationship and the distance between the pivots 56 and 59 is fixed, the pull on the cable 8 is exerted against the upper sheaves 50S, through which it is guided, and a turning force is applied to the bellcrank 50B which is transmitted through the shaft 51 and thence to the control surface.

On release of the control force in cable 8, the tensions in both cables 8 and 9 become equalized and of a magnitude which is somewhat below the normal rigging tension inasmuch as the pivot 59 had been drawn toward the pivot 51 during the application of the previous control force. As the cables become equalized the spring 61 pushes the valve pin 60 outwardly and restores the link 52 to its normal central position. At the same time the hydraulic pressure which had been developed in the outer portion of the cylinder is permitted to by-pass the piston through the conduit 57 and bleed through into the inner portion of the cylinder, thereby equalizing the fluid pressure on the opposite faces of the piston, in which state the spring 58 which had been extended beyond its normal length and therefore had developed a tensile pull between the piston and the cylinder, now is permitted to expend that pull in drawing the piston to its normal position and restoring the normal distance between the pivots 56 and 59 at which the entire movable assembly again becomes positioned in its central and equalized attitude. It will be obvious that for movements of the control surface in the opposite direction a control force exerted upon the cable 9 will cause the respective elements to function in a similar manner with the only exception that the parts, including the control surface, will be rotated in the opposite direction.

While I have shown and described several preferred embodiments of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

What is claimed is:

1. In aircraft construction a control system comprising a relatively fixed portion of the aircraft, a movable control surface associated therewith, means for operating the control surface including control cables, a cable tensioning device and means adapted to limit the tensioning effect of said device effective upon the application of a control force to the said operating means whereby the control surface is directly operated by the first said means during the application of said control force.

2. In aircraft, in a tension compensating device for a control surface, a pair of converging operating cables, a tensioning element connecting said cables to the control surface and means associated with said cable connection effecting the locking out of said tensioning element and the direct cable control of said surface upon the application of a predetermined tension differential in said cables.

3. In aircraft construction, a control system comprising a relatively fixed portion of the aircraft, a movable control surface associated therewith, means for operating the control surface including control cables, a cable tensioning device and means adapted to releasably lock out said tensioning device for the direct control of said surface upon the application of a control force upon one of said cables.

4. In a tension compensating device for a control system for a steerable body, in combination, a control surface movably mounted upon the said body, cable tensioning means having a pivotally fixed terminal carried by said surface adapted for both axial extension and pivotal movement with respect to said fixed terminal, the remaining terminal of said cable tensioning means being movably mounted with respect to said surface, operating means including cables connected to the remaining free terminal of said tensioning means for moving said control surface, the said tensioning means exerting predetermined pull upon said cables in the compensated normal attitude of the control system along the path of said axial movements, and detent means associated with said free terminal of said tensioning means initiated by control forces of predetermined magnitude applied to one of said cables adapted to transmit said forces directly to said control surface upon predetermined pivotal movement of said tensioning means about its said fixed terminal.

5. In a tension compensating device for aircraft control systems, a movable control surface, a pair of converging cable terminals, a tensioning element having a fixed terminal pivotally mounted upon said control surface, a floating element interconnecting said cable terminals with the remaining terminal of said tensioning element adapted to equalize the predetermined tensioning of said cables, and detent means carried by said surface adapted to engage said floating cable terminals and releasably attach the same to said control surface for its direct movement by control forces applied to either cable.

6. In aircraft control systems a movable control surface pivotally associated with the aircraft, a pair of cables for the operation of said surface, a tension compensating device for said cables fixed to said surface, said device comprising a frame element with oppositely extending lever portions, a tensioning element having a terminal fixed with respect to the surface adapted to maintain predetermined tension within the said operating cables, and locking means comprising a member movable with the remaining terminal of said element and a detent member fixed to the surface adapted upon actuation of said control cables to engage each other and releasably hold one of said cables fixed to the surface for its direct control.

7. In a cable tensioning device for an aircraft control system having a movable control surface, tensioning means pivotally carried at a point within said control surface, a pair of converging actuating cables guided at at least two points symmetrically disposed with respect to said first pivotal point, and means connecting said cables with the remaining free terminal of said tensioning means adapted to float freely in the tensional equalized inoperative state of said cables along symmetrically disposed paths, detent members fixedly carried upon the surface adjacent said free terminal whereby said floating cable terminal becomes locked to said surface upon the application of a control force to either cable in imparting asymmetrical positions to said last two points with respect to said first point.

8. A tension compensating device for aircraft cable control systems comprising a frame element adapted for rotation in fixed relationship with a control surface, at least two cable sheaves pivotally mounted upon said frame member, control cables symmetrically guided by said sheaves and having adjacent terminals, a link interconnecting the adjacent terminals of the said control cables, tensioning means interposed between said frame and said link and pivotally connected to each adapted to deflect the adjacent cable terminal portions, detent means carried by said frame adjacent said link, whereby, in the normal position of the control surface, a predetermined tension is induced within the control cables and upon application of control forces to either cable said link is releasably locked to said detent means for the operation of said surface.

9. In an aircraft control system, a control surface pivotally mounted on said aircraft, control horns extending oppositely from said pivot mounting substantially perpendicular to the normal axis of said surface, a pair of operating cables, means carried by said horns for guiding said cables, a tensioning element having a terminal carried by said surface spaced equidistant from said guide means, means connecting adjacent terminals of said cables with said element adapted to equally tension said cables when aligned with said pivot axis and said tensioning element terminal, and means to transmit control forces of magnitudes of tension in excess of a predetermined amount in either cable to its respective control horn in misaligned positions of said connecting means for the direct control of said surface when the magnitude of the control force tension exceeds that of the tensioning element.

10. In an aircraft control system for the operation of a pivoted surface by oppositely workable cables, connecting means joining the ends of said cables, means engaging said connection for said cables and having a terminal upon said surface adapted to produce tension in said cables, guide elements carried upon said surface for each said cable such that said tensioning means causes the ends of said cables to converge and to be symmetrically disposed with respect to the axis of said tensioning means, locking means comprising an element fixed to said surface and complementary engaging means associated with said cable connection whereby control forces exerted in either of said cables initiates relative movement between said cable and said tensioning means and causes releasable engagement of said connecting means with said locking means for the direct control of said surface.

11. In an aircraft control system for the operation of a pivoted surface, operating cable means engaging guide elements carried by said surface, tensioning means carried upon said surface engaging said cable means between said guide elements adapted to maintain a deflected portion in said cable means and compensate for slackening thereof, and locking means carried upon said surface for engagement with said cable means upon distortion of said deflected portion initiated by forces applied to said cable means whereby the said tensioning means is releasably locked out and the control surface is directly operated by said cable means.

12. A tension compensating device for a control surface comprising a substantially T-shaped frame member fixed to the control surface, a pair of control cables terminating at said member, a plurality of cable sheaves rotatably mounted upon said member, an extensible tensioning element attached to and disposed in alinement with the stem portions of same frame member and adapted to maintain predetermined rigging tension in said control cables, toothed portions fixed with respect to the control surface, a locking element connecting the adjacent cable terminals and the terminal of said tensioning element whereby a control force exerted in one of said control cables causes said locking element to releasably lock the actuated cable to the adjacent toothed portion to arrest the further extension of said tensioning element for the direct rotational control of the surface.

13. In a compensating device for control systems, a control surface, cables adapted for the movement of said surface, resilient means connecting adjacent terminals of said cables to said device adapted to induce predetermined tension in each cable, locking means adapted to cause direct engagement of either cable terminal initiated by tension in such cable in excess of said predetermined tension for direct movement of the control surface.

14. In aircraft, a tension compensating device for a control surface, comprising in combination, a pair of control cables, resilient means connecting said cables to the control surface adapted to maintain equal tension in each said cable in the normal position of the surface, ratchet means fixed with respect to said surface, pawl means movable with said cables adapted to engage said ratchet means initiated by tension differential in either said cable for cable actuation of said surface.

15. In a tension compensating device for a control system for a steerable body, a control surface movably mounted upon the body, tensioning means including spring-opposed telescoping elements having a pivotally fixed and a movable terminal, said tensioning means adapted for both axial extension and pivotal movement with respect to its first said terminal fixedly carried upon the control surface, operating means connected to the said movable terminal of said tensioning means for maintaining the compensated normal attitude of the control system along the path of said axial movement, and means including a pawl and laterally spaced ratchet elements adapted to engage each other and transmit operating forces directly to said control surface upon pivotal movement of said tensioning means in excess of a predetermined amount.

16. A tension compensating device in aircraft comprising a base element adapted to impart rotation to a control surface, flexible actuating means of equal lengths having their adjacent ends fixed with respect to each other, guide means carried by the base element, resilient telescopic means pivotally mounted upon said base element and pivotally associated with the terminals of said actuating means adapted to deflect the latter from the straight and shortest position between said guide means and further adapted to induce a predetermined tension within said actuating means, and means adapted to lock one of said terminals to said base element upon the initiation of actuating forces in excess of said predetermined tension.

17. In aircraft control systems, a control surface, means for moving said surface including at least two flexible cables, hydraulic compensating means movably mounted upon said surface adapted to provide equal and predetermined tension in said cables, valve means carried upon said hydraulic means actuated by control forces applied to one of said cables adapted to hydraulically lock said compensating means for movement of said surface.

18. In a cable tension compensating device, an element adapted to rotate with a control surface, guide means carried by said element spaced from and symmetrically disposed with respect to the axis of rotation of said control surface, flexible actuating elements engaging said guide elements and interconnected to each other, hydraulic means pivotally associated with said first element adapted to exert a predetermined force against said interconnection of the flexible actuating elements and to induce therein predetermined equal tensile stresses, and means to arrest said tension inducing force actuated by tensile forces within either of said actuating elements in excess of said initial predetermined force by pivotal movement of said hydraulic means.

19. In aircraft, a tension compensating device for a control surface, comprising in combination, a pair of control cables, spring tensioning means resiliently connecting the cables to the control surface adapted for balanced tension in each said cable in the normal position of the surface and hydraulic means comprising a piston element pivotally mounted upon said surface and reciprocal within a cylinder element, a fluid system associated with said piston element and a valve in said fluid system actuated by increased tension in either cable adapted to lock the said hydraulic means and arrest said tensioning means for direct control of the surface.

20. In aircraft control systems, a cable tension compensating device comprising a frame element fixedly associated with a movable control surface, at least two flexible cable runs of equal length movably associated with said frame element, friction reducing elements over which said cables are adapted to be guided and to exert control forces, an hydraulic piston and cylinder assembly having a terminal pivotally associated with said frame element, an element interconnecting said control cables pivotally associated with the opposite terminal of said piston and cylinder assembly, the normal distance between said piston and cylinder pivoted terminals being such that the cable elements are drawn into a co-extending symmetrical relationship having predetermined balanced forces induced therein, a tension spring element adapted to maintain said normal piston and cylinder relationship and said predetermined cable tension, and hydraulic valve means actuated by tensile forces in excess of said predetermined amount in either cable run adapted to lock said piston with respect to said cylinder for rotation of said control surface.

HENRY H. BRUDERLIN.